United States Patent
Bremer et al.

(10) Patent No.: US 6,307,893 B1
(45) Date of Patent: Oct. 23, 2001

(54) SYSTEM AND METHOD FOR TRANSMIT SIGNAL SPECTRAL SHAPING

(75) Inventors: Gordon Bremer, Clearwater; William L. Betts, St. Petersburg, both of FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/015,478

(22) Filed: Jan. 28, 1998

Related U.S. Application Data (60) Provisional application No. 60/039,050, filed on Mar. 5, 1997.

(51) Int. Cl.[7] ........................................ H04K 1/02
(52) U.S. Cl. ............................................. 375/296
(58) Field of Search ................... 375/285, 296, 375/346, 284, 261, 278; 332/159; 329/349

(56) References Cited

U.S. PATENT DOCUMENTS

| | | | | |
|---|---|---|---|---|
| 4,791,483 | * | 12/1988 | Miller | 375/245 |
| 5,249,200 | * | 9/1993 | Chen et al. | 375/285 |
| 5,388,124 | * | 2/1995 | Laroia et al. | 375/286 |
| 5,396,519 | * | 3/1995 | Betts et al. | 375/296 |
| 5,446,758 | * | 8/1995 | Eyuboglu | 375/259 |
| 5,488,633 | * | 1/1996 | Laroia | 375/262 |
| 5,512,957 | * | 4/1996 | Hulyalkar | 348/607 |
| 5,878,077 | * | 3/1999 | Betts | 375/222 |

* cited by examiner

*Primary Examiner*—Chi Pham
*Assistant Examiner*—Kevin M. Burd
(74) *Attorney, Agent, or Firm*—Thomas, Kayden, Horstemeyer & Risley (57) ABSTRACT

A system and method for shaping a transmit signal spectrum allows a transmit precoder and a spectral shaping filter to precode and shape a transmit signal without the need for receiving communication channel response information from a receiver or the need for a training period. The resultant shaped transmit spectrum signal meets regulatory requirements for the amount of energy transmitted per hertz of bandwidth.

21 Claims, 5 Drawing Sheets

SYSTEM AND METHOD FOR TRANSMIT SIGNAL SPECTRAL SHAPING

CROSS REFERENCE TO RELATED APPLICATION

This document claims priority to and the benefit of the filing date of co-pending provisional application entitled SPECTRAL SHAPING, assigned Ser. No. 60/039,050, and filed Mar. 5, 1997 and is hereby incorporated by reference.

FIELD OF THE INVENTION

The present invention relates generally to communication systems, and more specifically, to a system and method which allows for the shaping of a transmit signal spectrum in a modem in order to control the amount of power transmitted in a particular frequency bandwidth.

BACKGROUND OF THE INVENTION

Modems, or remote terminal units, convey information from one location to another over a data communications connection. Digital Subscriber Line (DSL) technology now enables modems to communicate large amounts of data. Modems normally communicate by modulating a baseband signal carrying digital data, precoding the transmit signal to match channel impulse response characteristics, converting the modulated digital data signal to an analog signal, and transmitting the analog signal over a conventional copper wire pair using techniques that are known in the art. These known techniques include mapping the information to be transmitted into a signal space constellation, differentially encoding the information, and modulating the information. The signal space constellation can include both analog and digital information or merely digital information.

Communication signals, such as those used in digital subscriber line (DSL) technology, that are transmitted over an analog copper wire pair must meet specific power and frequency requirements as required by government regulations. These requirements dictate that a limited amount of energy per unit of bandwidth be transmitted for a given portion of the frequency spectrum. Typically, higher power is permitted to be transmitted at lower frequencies, while as transmit frequency increases, the power transmitted must be decreased. These government regulatory requirements are designed to limit interference and are imposed on all services that share the analog communications system. Previously, there has been no way to provide the required spectral shaping without unduly limiting the available transmit power.

Furthermore, conventional preceding techniques as described in U.S. Pat. No. 5,396,515, U.S. Pat. No. 5,559,835 and U.S. Pat. No. 5,159,610, and specified in the International Telecommunications Union-Telecommunications (ITU-T) V0.34 standard require a receiver to reply to a transmitter with information regarding the channel response of the communications channel during a training period so as to enable the transmitter to set its precoder. This requires a lengthy training period in which a modem transmitter awaits information from a receiver in order to set the transmitter's precoder in order to maximize transmission efficiency.

SUMMARY OF THE INVENTION

It is desirable to have a precoder in a modem transmitter that also contains a shaping filter that can shape the transmit signal spectrum to meet regulatory requirements without requiring a training period. The present invention provides a system and method for shaping a transmit signal spectrum. The system includes a filter having a set of filter coefficients defining a particular transmit spectrum. The defined transmit spectrum is one that meets regulatory requirements regarding power transmitted within particular frequency limits. In the preferred embodiment, a finite impulse response (FIR) filter is illustrated, however other filter configurations are possible. The filter is designed to receive a signal space mapped signal from a mapper as is known in the art of modem communications. This signal space mapped signal can be a multidimensional mapped signal, for example a quadrature amplitude modulated (QAM) signal, or it can be a one-dimensional signal, such as that generated by pulse amplitude modulation (PAM). This signal space mapped signal has subtracted from it a substantially flat spectrum signal from a modulo operator. The output of the filter is added to the signal space mapped substantially flat spectrum signal and provides as an output a precoded signal having the desired transmit signal spectrum.

The filter signal is fed back into a feedback loop designed to receive the same signal space mapped substantially flat spectrum signal that was input to the filter and, due to feedback, generate the inverse transfer function, resulting in an output that has a frequency response exactly opposite that of the output of the filter. A modulo operator in the feedback loop follows the filter. The modulo operator is designed to operate on the signal from the filter in order to restrict the magnitude of the output of the filter resulting in a substantially flat spectrum signal. The modulo operator operates on the signal from the filter whereby if the voltage of the signal is greater than a preset value, twice that value is subtracted from the signal. A subtractor designed to subtract the output signal of the modulo operator from the signal space mapped signal provides the input to the filter. The input to the filter is essentially a substantially flat spectrum signal and results in a precoded transmit signal output from the filter that is supplied to an adder, which is configured to add the output of the filter to the substantially flat spectrum signal and output a transmit signal that meets the desired transmit spectrum characteristics.

The invention has numerous advantages, a few of which are indicated hereafter, as examples.

An advantage of the present invention is that it allows the shaping of a transmit signal using a precoder without the requirement of a receiver sending back to a transmitter a signal containing channel response information. For example, the present invention can be implemented as a standard preset precoder that uses existing coefficients or in combination with a standard precoder using remotely computed coefficients.

Another advantage of the present invention is that it optimizes performance in a modem that implements spectral shaping.

Another advantage of the present invention is that modem training is not required, thus allowing the transmitter to develop the required transmit signal spectrum including precoding without the need for modem training. This allows the modem to be used in broadcast applications where multiple receivers monitor a common transmitter.

Another advantage is that the modem can be used in multipoint applications where multiple transmitters are used to transmit to a common receiver.

Other features and advantages of the present invention will become apparent to one of skill in the art upon review of the following drawings and the detailed description of the preferred embodiment.

BRIEF DESCRIPTION OF THE DRAWING

The present invention can be better understood with reference to the following drawings. The components in the drawings are not necessarily to scale, emphasis instead being placed on clearly illustrating the principles of the present invention.

DETAILED DESCRIPTION OF THE PREFERRED EMBODIMENT

The present invention can be implemented in software, hardware, or a combination thereof. In the preferred embodiment, the elements of the present invention are implemented in software that is stored in a memory and that configures and drives a suitable digital signal processor (DSP) situated in a modem. However, the foregoing software can be stored on any computer-readable medium for use by or in connection with any suitable computer-related system or method. In the context of this document, a computer-readable medium is an electronic, magnetic, optical, or other physical device or means that can contain or store a computer program for use by or in connection with a computer-related system or method.

The preferred embodiment will be described in the context of a multidimensional signal space signal with the implementation of FIR filters, however, other filter designs and one-dimensional signal space signals are contemplated to be within the spirit and scope of the present invention.

Figure 1:
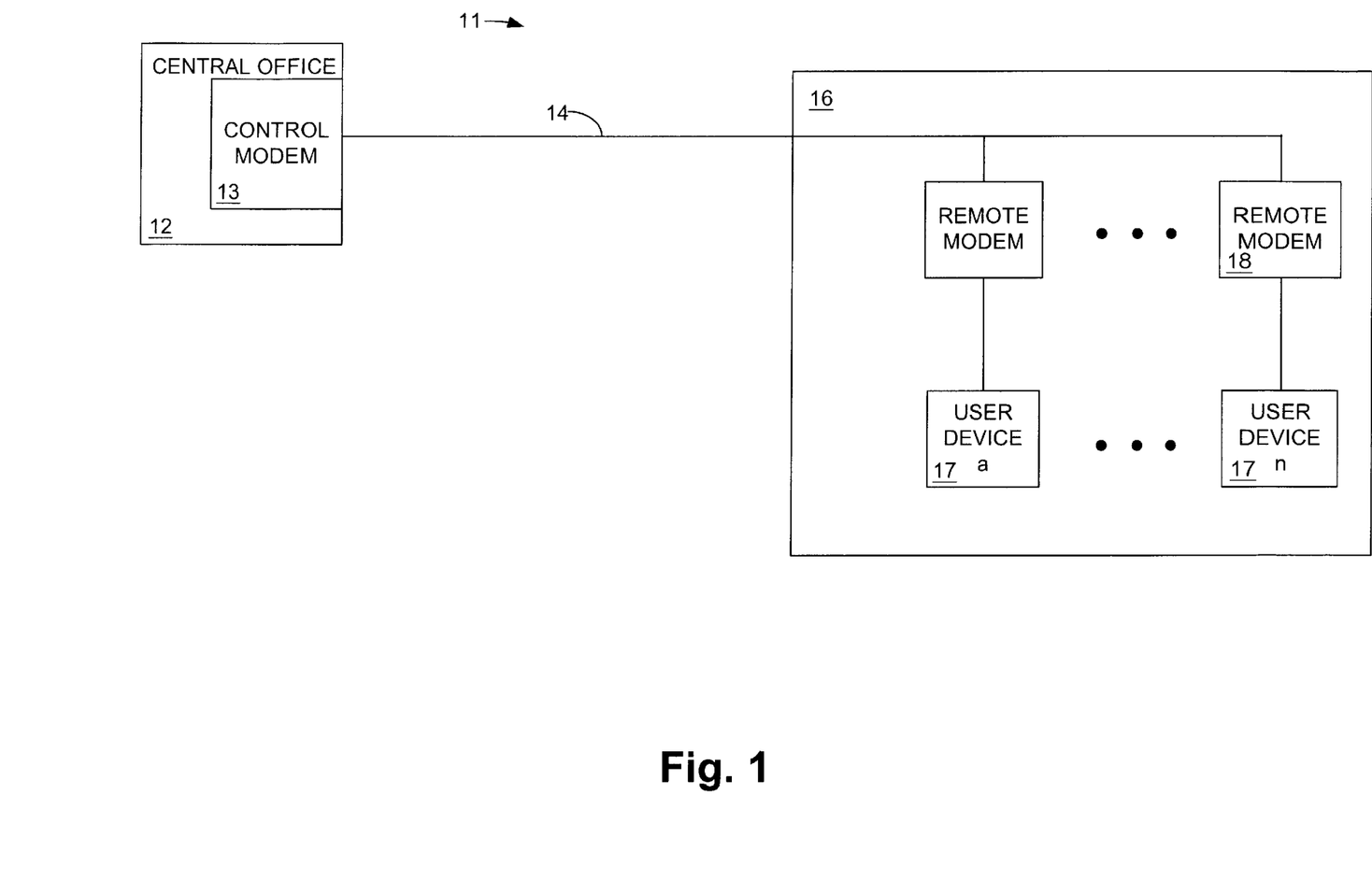
FIG. 1 is a block diagram illustrating a network topography containing a plurality of digital subscriber line (DSL) remote modems and control modem embodying the concepts and features of the present invention.

With reference now to the figures wherein like reference numerals designate corresponding parts throughout the several views, FIG. 1 shows a view illustrating a multipoint communications topography 11 in which digital subscriber line (DSL) remote modems 18 and control modem 13 employing the concepts and features of the system and method for transmit signal spectral shaping are used. Remote location 16 is connected to central office location 12 and control modem 13 via communications channel 14. Channel 14 is typically a copper wire pair that runs between a telephone company central office and a remote residential or business location. Remote location 16 contains one or more remote modems 18 connecting one or more user devices 17 to communication channel 14. Remote location 16 can be a residential, business or any other location. By using modems 18 and 13 employing the concepts and features of the present invention, it is possible to transmit a signal spectrum that is shaped to meet regulatory requirements while taking advantage of precoding the signal in the transmitter of the modem without the need for a training period in which a receiver communicates channel impulse response characteristics back to the transmitter. The present invention benefits from the use of circular constellations with either coded or uncoded modulation, while taking advantage of the improved signal-to-noise ratio made possible with precoding and nonlinear encoding. While the following preferred embodiment is described with reference to modem 18, the concepts and features of the system and method for transmit signal spectral shaping are equally applicable to control modem 13.

Figure 2:
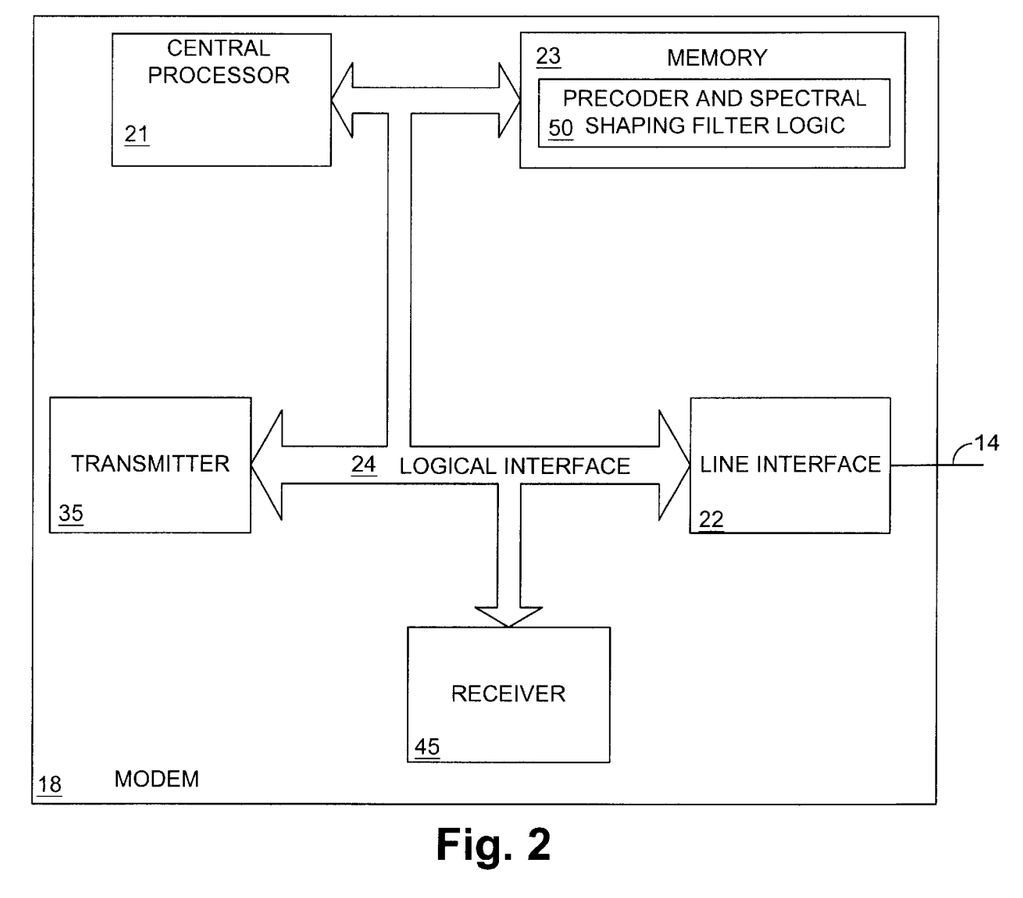
FIG. 2 is a block diagram illustrating a modem of FIG. 1 containing the concepts and features of the present invention.

Now referring to FIG. 2, shown is a schematic view illustrating a modem 18 of FIG. 1 employing the concepts and features of the present invention. Modem 18 contains conventional components as is known in the art of data communications. Central processor 21 controls the operation of the modem's transmitter 35 and receiver 45 through logical interface 24. Memory 23 contains precoder and spectral shaping filter logic 50 of the present invention. Illustratively, memory 23 stores precoder and spectral shaping filter logic 50 that is executed by the central processor 21. The components of the modem connect to communications channel 14 through line interface 22. By employing the concepts of the present invention, a transmit signal spectrum that meets regulatory requirements can be achieved without the need for a training period, resulting in a shaped signal spectrum having a high degree of stability.

Figure 3:
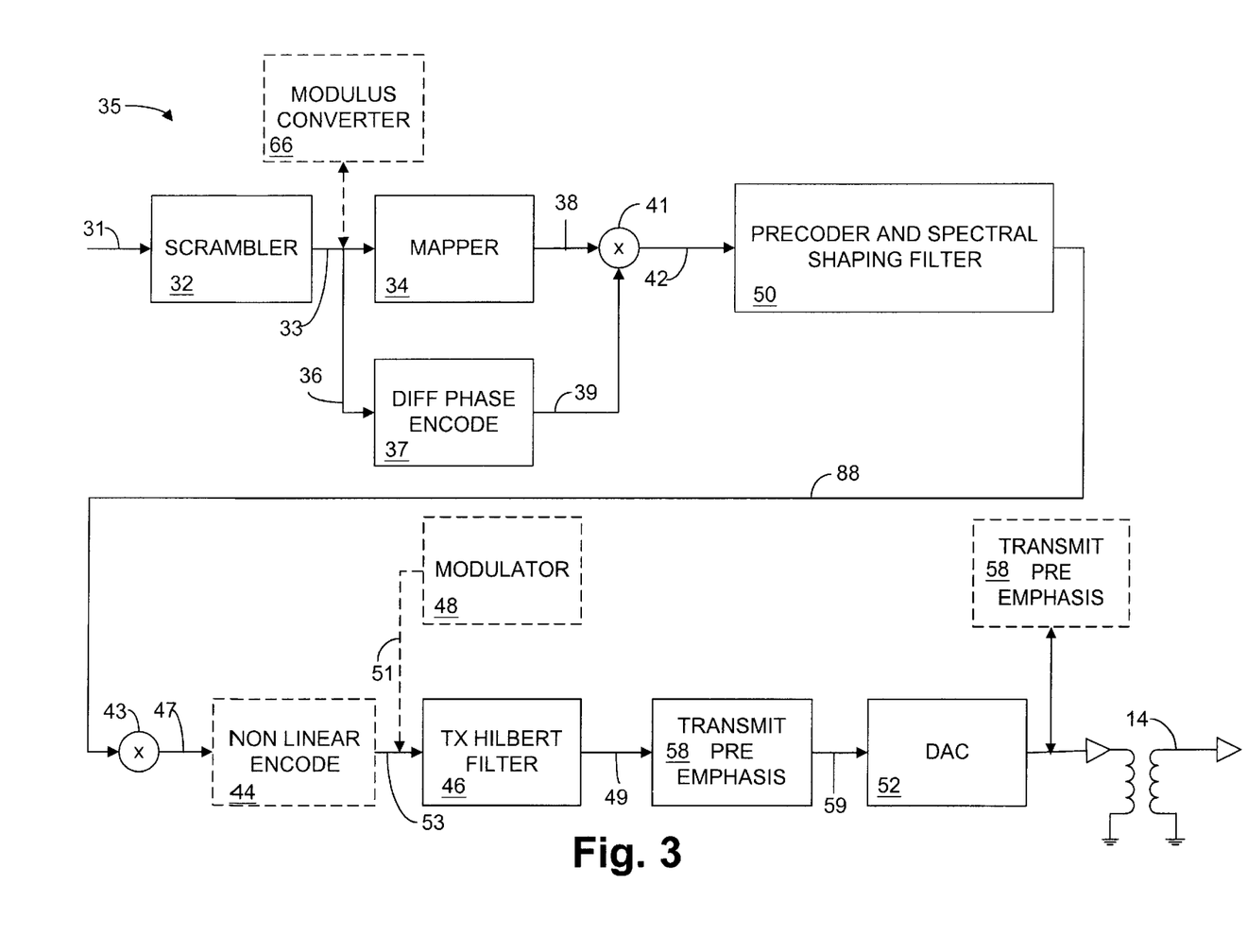
FIG. 3 is a block diagram illustrating the transmitter of FIG. 2.

With reference to FIG. 3, shown is a preferred embodiment of a transmitter 35 of modem 18 employing the concepts of the present invention. This embodiment is merely an example of a possible implementation. An International Standards Architecture (ISA) bus, a standard computer bus which eliminates the need for interfaces, supplies data, in the form of a data word that can be either 8 or 16 bits for the preferred embodiment, on connection 31 to scrambler 32. This data word is transformed into an N bit word by counting bits and shifting to arrive at a smaller number of bits, in this example, an N bit data word. By employing a circular constellation, N can be any number. The conversion of the 8 or 16 bit word to an N bit word is known in the art and omitted in FIG. 3 for clarity.

The N bit word is then scrambled by scrambler 32. Scrambler 32 can be either a self synchronized scrambler or a preset free running scrambler as is known in the art. Depending on the application, the preset scrambler may have some advantages, as in the case of using Reed-Solomon coding, as is known in the art. A scrambled N bit word is output on connection 33. The 2 least significant bits of the scrambled N bit word are separated and input on connection 36 to a differential phase encoder 37 which has logic configured to add the 2 least significant bits to the existing 2 bits in its memory, resulting in 2 differential bits that are used for phase rotation and supplied on connection 39 to rotator 41. The resulting N-2 bit word on connection 33 is supplied to mapper 34 which maps the N-2 bit word into a signal space, resulting in a mapped N-2 bit word which is supplied on connection 38 to rotator 41. Optionally, fractional bit rate encoding can be accomplished by inserting a modulus converter 66, or other fractional bit rate device such as a shell mapper or a device which enables constellation switching in the transmitter between scrambler 32 and mapper 34. Modulus converter 66 allows the transmission of signal space constellations having a quantity of symbols other than ones of powers of 2 and is depicted in a dashed line to indicate that it is optional. Modulus conversion is a well known technique in the art of communications for allowing the transmission of fractional bit rates, and is described in U.S. Pat. No. 5,103,227. Constellation switching allows the transmission of fractional bit rates by, for example, first transmitting 6 bits in one symbol and 7 bits in the next symbol if it is desired to transmit 6 ½ bits. For 6 ¾ bits one would transmit 7 bits per symbol for three symbol cycles and transmit 6 bits per symbol for the fourth symbol cycle. Shell mapping blocks the data into frames and a shell mapping algorithm, such as that described in the ITU-T V0.34 specification, is used to map the frames of data into a constellation of a certain size.

Rotator 41 performs vector multiplication on the 2 differential bits and the mapped N-2 bit word to cause a phase rotation, thus producing the final signal space mapped signal which is embodied in a circular constellation on connection 42. The circular constellation on connection 42 is then supplied to precoder and spectral shaping filter 50 of the present invention.

Figure 4:
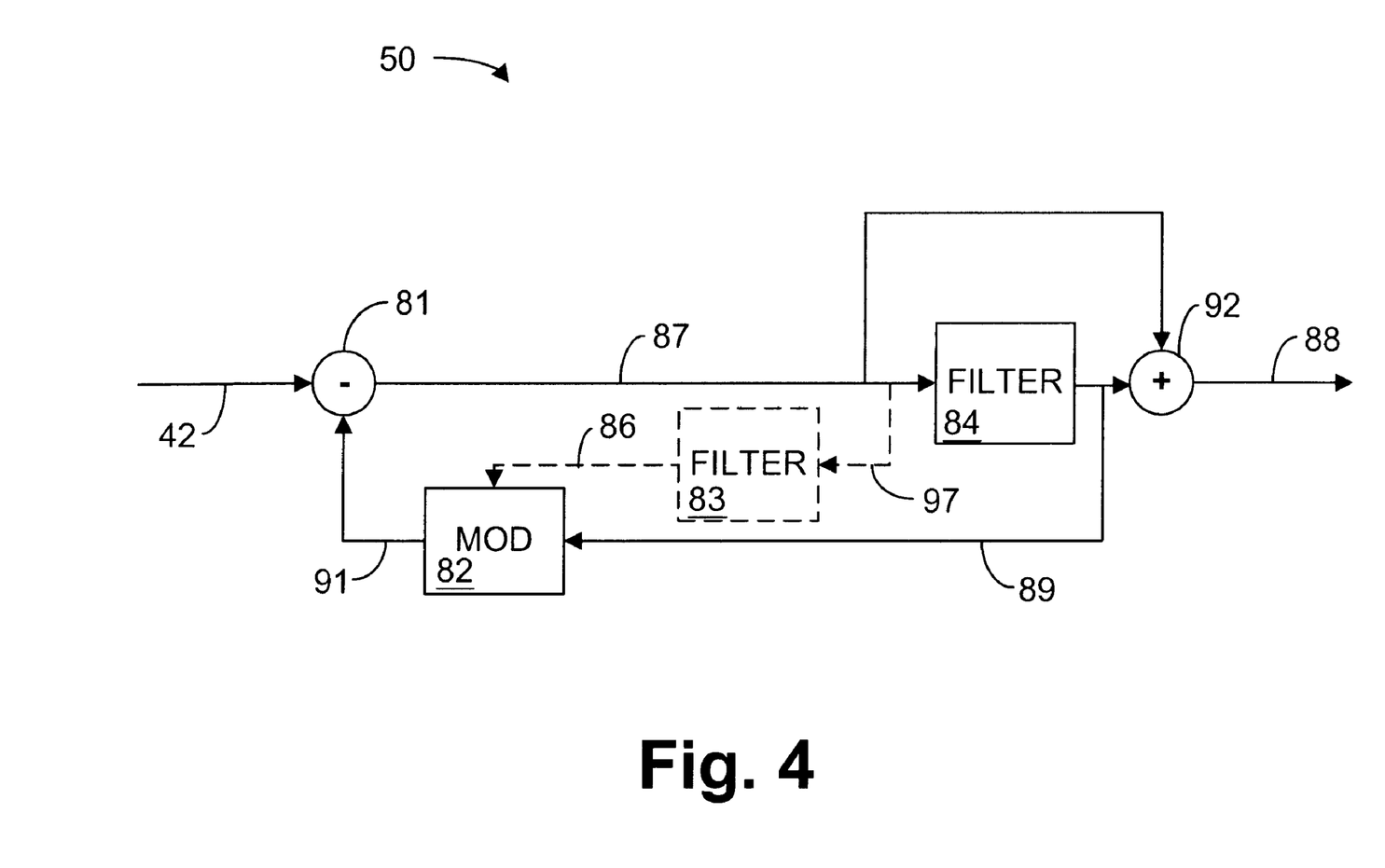
FIG. 4 is a block diagram illustrating the precoder and signal shaping filter of the transmitter of FIG. 3.

With reference now to FIG. 4, shown is the precoder and spectral shaping filter 50 of FIG. 3. A filter 84 having a set of complex filter coefficients defining a particular transmit spectrum receives as input a signal space mapped substantially flat spectrum signal on connection 87. Filter 84 can also use real filter coefficients, however the bandwidth resolution would be unnecessarily restricted. Complex filter coefficients provide wider bandwidth resolution. The defined transmit spectrum is one that meets regulatory requirements regarding power transmitted within particular frequency limits. Filter 84 then processes the signal space mapped substantially flat spectrum signal on connection 87. The output of filter 84 is added to its input from line 87 by adder 92 to provide as an output a precoded signal having the desired transmit signal spectrum on connection 88.

An optional second filter 83 having a set of complex filter coefficients identical to that of the first filter, and which resides in a feedback loop, is designed to receive, on connection 97, the same signal space mapped substantially flat spectrum signal that was input to first filter 84 and, by feedback, generate the inverse transfer function, resulting in a signal that has a frequency response exactly opposite that of the signal at the output of first filter 84 on line 88. The preferred embodiment uses the output of filter 84 on line 89 to avoid using duplicate filter 83. If a conventional precoder is used in the receiver of remote modem 18 then filter 83 would use the coefficients provided by the remote receiver.

Modulo operator 82 in the feedback loop follows filter 84, or filter 83 if used. Modulo operator 82 is designed to operate on the signal from filter 84 in order to restrict the magnitude of the output of filter 84 resulting in a substantially flat spectrum signal. Modulo operator 82 operates on the signal on connection 89 whereby if the voltage of the signal on connection 89 is greater than a preset value, twice that value is subtracted from the signal, or if the voltage is more negative than the negative of the preset value then twice that value is added to the more negative signal. Following modulo operator 82 is subtractor 81 designed to subtract the output signal of modulo operator 82 on connection 91 from the signal space mapped signal on connection 42 and provide the signal on connection 87 that is input to filter 84 and optionally to filter 83. The output of filter 84 and adder 92 is essentially a shaped spectrum signal and results in a precoded transmit signal output from adder 92 that meets the required transmit spectrum characteristics. Modulo operator 82 may optionally be located on line 87 after subtractor 81 to implement Tomlinson Precoding as may best be used when transmitting square signal space constellations.

Referring back to FIG. 3, after processing by precoder and spectral shaping filter 50 the precoded and spectrally shaped circular constellation is supplied on connection 88 to scaler 43. Scaler 43 multiplies the circular constellation by a scalar which is a function of the data rate and supplies the scaled constellation on connection 47 to optional nonlinear encoder 44. Nonlinear encoder 44 encodes the signal as disclosed in U.S. Pat. No. 5,265,127 and is optional as disclosed herein. The signal is then supplied to transmit (TX) Hilbert filter 46 for carrierless amplitude/phase (CAP) modulation. In an alternate embodiment of the present invention, the scaled circular constellation on connection 53 is modulated using modulator 48, using a technique such as, for example, quadrature amplitude modulation (QAM), or pulse amplitude modulation (PAM) as is known in the art.

Because everything disclosed thus far occurs at the symbol rate of the modem, with the symbol rate equal to the bandwidth of the modem, less expensive components may be employed, thus reducing the cost of implementation.

Either the CAP modulated signal or the QAM or PAM modulated signal is supplied on connection 49 to transmit preemphasis filter 58. As is known in the art, transmit pre emphasis filter 58 processes the signal to shape its passband spectrum. The preemphasized transmit signal is next supplied on connection 59 to digital to analog converter 52 for conversion to an analog signal that can be transmitted conventionally over communication channel 14 as is known in the art. Optionally, transmit pre emphasis filter 58 can reside after the DAC to provide pre emphasis in the analog domain.

Figure 5:
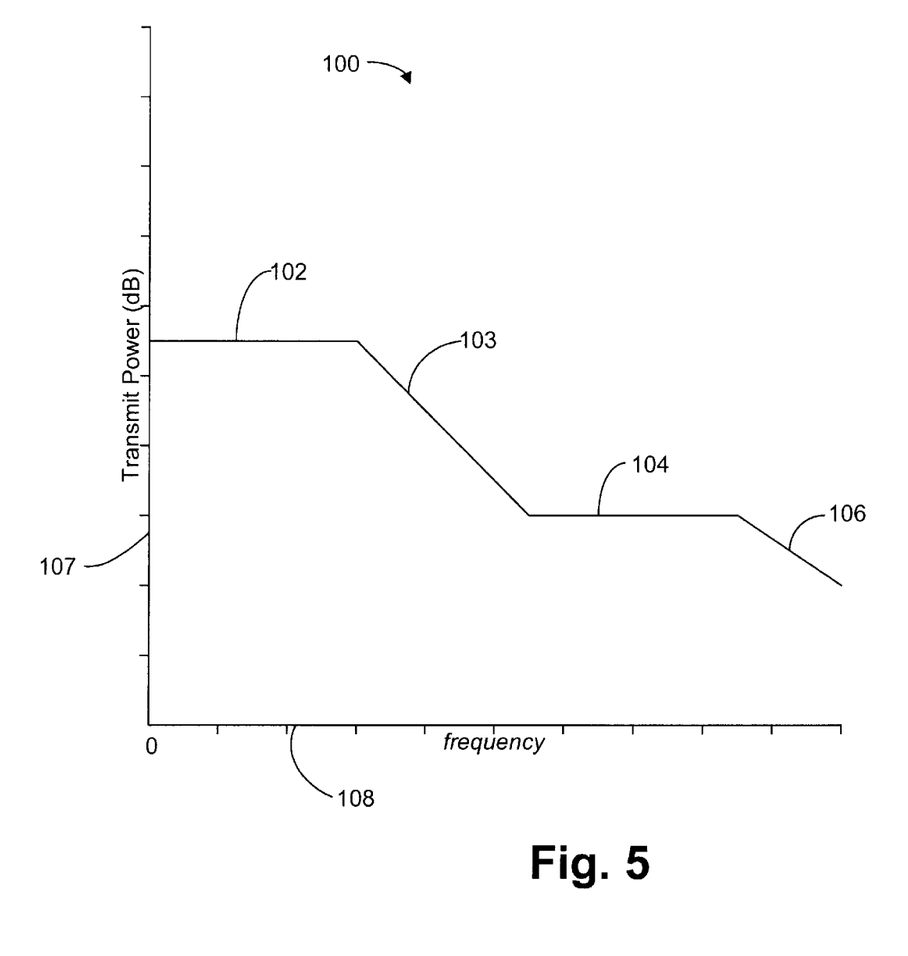
FIG. 5 is a graphical representation of the shaped transmit signal spectrum of the transmitter of FIG. 3.

Referring now to FIG. 5, shown is a graphical representation of an example of the shaped transmit signal spectrum 100 of transmitter 35. Transmitted power is referenced on the vertical axis 107 and frequency is referenced on the horizontal axis 108. The curve represents power transmitted at various frequency levels. As can be seen, transmitted power is higher at lower frequency levels, as depicted by section 102 of the curve. As transmit frequency increases transmitted power is reduced as evidenced by section 103 of the curve until a lower transmit power is achieved as shown by section 104 of the curve. As frequency gets higher, power continues to be reduced as shown by section 106 of the curve.

It will be obvious to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

What is claimed is:

1. A system for shaping a transmit signal spectrum, comprising:

a filter having a set of filter coefficients defining a particular transmit spectrum, said filter designed to receive as input a signal space mapped flat spectrum signal, said filter designed to process said signal space mapped flat spectrum signal and output a precoded signal having a desired precoded signal spectrum;

a feedback loop containing a modulo operation designed to operate on said precoded signal from said filter, said modulo operation designed to restrict the magnitude of said precoded signal resulting in a substantially flat spectrum signal;

a subtractor designed to subtract the output signal of said modulo operation from a signal space mapped signal resulting in said signal space mapped flat spectrum signal; and an adder designed to add the output of said filter to said signal space mapped flat spectrum signal, said adder designed to output a precoded transmit signal that meets a desired signal spectrum;

wherein, the precoded transmit signal is the output of the system for shaping the transmit signal spectrum.

2. The system of claim 1, wherein said signal space mapped flat spectrum signal is a multidimensional signal.

3. The system of claim 1, wherein said signal space mapped flat spectrum signal is a one-dimensional signal.

4. The system of claim 1, wherein said filter resides in a feed forward loop.

5. The system of claim 2, wherein said multidimensional signal space mapped signal is a quadrature amplitude modulated (QAM) signal.

6. The system of claim 2, wherein said multidimensional signal space mapped signal is a carrierless amplitude/phase modulated (CAP) signal.

7. The system of claim 3, wherein said one-dimensional signal space mapped signal is a pulse amplitude modulated (PAM) signal.

8. A method for shaping a transmit signal spectrum in a communication device, comprising the steps of:

supplying to a filter having a set of filter coefficients defining a particular transmit spectrum, a signal space mapped flat spectrum signal, said filter designed to process said signal space mapped flat spectrum signal and output a precoded signal having a particular precoded signal spectrum;

supplying said precoded to a modulo operation in a feedback loop, said modulo operation designed to restrict the magnitude of said precoded signal resulting in a flat spectrum signal;

supplying said flat spectrum signal to a subtractor resulting in said signal space mapped flat spectrum signal; and adding said precoded signal to said signal space mapped flat spectrum signal resulting in a precoded transmit signal that meets a desired signal spectrum;

wherein, the precoded transmit signal is the output of the communication device.

9. The method of claim 8, wherein said signal space mapped flat spectrum signal is a multidimensional signal.

10. The method of claim 8, wherein said signal space mapped flat spectrum signal is a one-dimensional signal.

11. The method of claim 8, wherein said filter resides in a feed forward loop.

12. The method of claim 9, wherein said multidimensional signal space mapped signal is a quadrature amplitude modulated (QAM) signal.

13. The method of claim 9, wherein said multidimensional signal space mapped signal is a carrierless amplitude/phase modulated (CAP) signal.

14. The method of claim 10, wherein said one-dimensional signal space mapped signal is a pulse amplitude modulated (PAM) signal.

15. A computer readable medium having a program for shaping a transmit signal spectrum in a communication device, comprising:

means for supplying to a filter having a set of filter coefficients defining a particular transmit spectrum, a signal space mapped flat spectrum signal, said filter designed to process said signal space mapped flat spectrum signal and output a precoded signal having a particular precoded signal spectrum;

means for supplying said precoded to a modulo operation in a feedback loop, said modulo operation designed to restrict the magnitude of said precoded signal resulting in a flat spectrum signal;

means for supplying said flat spectrum signal to a subtractor resulting in said signal space mapped flat spectrum signal; and means for adding said precoded signal to said signal space mapped flat spectrum signal resulting in a precoded transmit signal that meets a desired signal spectrum;

wherein, the precoded transmit signal is the output of the communication device.

16. The computer readable medium of claim 15, wherein said signal space mapped flat spectrum signal is a multidimensional signal.

17. The computer readable medium of claim 15, wherein said signal space mapped flat spectrum signal is a one-dimensional signal.

18. The computer readable medium of claim 15, wherein said filter resides in a feed forward loop.

19. The computer readable medium of claim 16, wherein said multidimensional signal space mapped signal is a quadrature amplitude modulated (QAM) signal.

20. The computer readable medium of claim 16, wherein said multidimensional signal space mapped signal is a carrierless amplitude/phase modulated (CAP) signal.

21. The computer readable medium of claim 16, wherein said one-dimensional signal space mapped signal is a pulse amplitude modulated (PAM) signal.

\* \* \* \* \*

UNITED STATES PATENT AND TRADEMARK OFFICE
CERTIFICATE OF CORRECTION

PATENT NO.    : 6,307,893 B1
DATED         : October 23, 2001
INVENTOR(S)   : Bremer et al.

It is certified that error appears in the above-identified patent and that said Letters Patent is hereby corrected as shown below:

<u>Column 7,</u>
Line 26, after "precoded" insert -- signal --.

<u>Column 8,</u>
Line 16, after "precoded" insert -- signal --.

Signed and Sealed this

Sixth Day of August, 2002

Attest:

Attesting Officer

JAMES E. ROGAN
Director of the United States Patent and Trademark Office